United States Patent

Röckseisen

Patent Number: 6,088,106
Date of Patent: Jul. 11, 2000

[54] METHOD FOR THE CONTACT-FREE MEASUREMENT OF THE DISTANCE OF AN OBJECT ACCORDING TO THE PRINCIPLE OF LASER TRIANGULATION

[75] Inventor: Armin Röckseisen, Scharnebeck, Germany

[73] Assignee: LAP GmbH Laser Applikationen, Luneburg, Germany

[21] Appl. No.: 09/167,771

[22] Filed: Oct. 7, 1998

[30] Foreign Application Priority Data

Oct. 31, 1997 [EP] European Pat. Off. .............. 97119012

[51] Int. Cl.⁷ .................................................. G01B 11/14
[52] U.S. Cl. ........................................... 356/375; 356/372
[58] Field of Search .................................... 356/372, 375, 356/376, 379, 380, 383, 384, 385, 386, 387; 250/559.24

[56] References Cited

U.S. PATENT DOCUMENTS

| | | | |
|---|---|---|---|
| 4,647,208 | 3/1987 | Bieman | 356/375 |
| 4,731,853 | 3/1988 | Hata et al. | 356/376 |
| 4,978,224 | 12/1990 | Kishimoto et al. | 356/372 |
| 5,076,697 | 12/1991 | Takagi et al. | 356/376 |
| 5,461,478 | 10/1995 | Sakakibara et al. | 356/376 |

FOREIGN PATENT DOCUMENTS 0 147 501  7/1985  European Pat. Off. .
2 264 602  9/1993  United Kingdom .

*Primary Examiner*—Richard A. Rosenberger
*Attorney, Agent, or Firm*—Vidas, Arrett & Steinkraus

[57] ABSTRACT

A method for the contact-free measurement of the distance of an object according to the principle of laser triangulation, in which a laser beam is directed onto the measuring object and the illuminated region is so imaged on a line-like sensor with prior-arranged optics, which is arranged laterally next to the laser, that the position of the image on the sensor changes with the distance of the measuring object and from the distance of the image from the laser a distance signal is obtained, wherein at least one laser projects a line onto the measuring object and the light plane of the laser line and the observation plane of the line-like sensor form an angle and intersect in a parallax-free cross.

12 Claims, 2 Drawing Sheets

METHOD FOR THE CONTACT-FREE MEASUREMENT OF THE DISTANCE OF AN OBJECT ACCORDING TO THE PRINCIPLE OF LASER TRIANGULATION

BACKGROUND OF THE INVENTION

The present invention relates to the contact-free measurement of the distance of an object according to the principle of laser triangulation, according to the introductory part of patent claim 1.

Such a method is known per se and is applied in many aspects. A laser beam is directed perpendicularly on the measuring object and here produces a point of light (diffuser Reflex). Laterally next to the laser a line-like sensor is arranged (PSD or CCD). The line-like sensor consists of, as is known, a multitude of individual light-sensitive elements of a low dimension, which are electronically scanned. The light point on the measuring object is imaged on the line-like sensor via suitable sensor optics. Depending on the distance between the measuring system and the object the position of the imaged light point changes on the sensor line. The position on the line is thus a measure for the distance in each case. The output signal of the sensor line may as a result serve as a distance signal from which then in a suitable manner the distance is computed.

The known method requires that the laser beam is directed perpendicularly onto the measuring object so that with a changing distance no parallax displacement of the projected laser point takes place. Such an arrangement has the disadvantage that the measuring apparatus must be arranged in the measuring axis. Such an arrangement in many cases is not desirable or not possible, for example when in the measuring axis there is located another object or when the position measurement of objects which move towards the measuring system, is carried out at a certain location, and then move further in the same direction. This for example is the case with the distance measurement of steel slabs on a roller table.

BRIEF DESCRIPTION OF THE INVENTION

It is the object of the invention to give a method for the contact-free measurement of an object according to the principle of laser triangulation with which it can be avoided that the measuring apparatus is arranged in the measuring axis.

With the method according to the invention a laser source is used which produced a line on the measuring object. If the plane which is spanned by the line beam is perpendicular to the surface of the measuring object or of the measuring axis, the position of the line does not change with a change in distance of the measuring object. The same applies for the line which arises when the sensor line is projected onto the facing surface of the measuring object and the "observation plane" of the sensor line is perpendicular to the measuring object or the measuring axis. With the method according to the invention the light plane of the line laser and the observation plane of the sensor line intersect at an angle. By way of this a parallax-free cross arises, i.e. the cross does not change its position when the measuring object is moved along the measuring axis. The laser optics are directed onto the region of the projected laser line, in that the line is intersected by the line of the sensor, which is projected on the measuring object. In this manner the distance measurement according to the laser triangulation may be carried out as previously. The line laser and sensor are located however outside the measuring axis and as a result do not represent a hindrance when the measuring object is moved beyond the measuring apparatus.

With the help of two or more lasers in each case a line may be projected onto the measuring object, wherein the lines run parallel to one another. The line which arises by imaging the observation plane on the measuring object intersects the parallel laser lines at an angle, for example at right angles. In this manner several light planes are projected which all intersect with the sensor observation plane. In this manner from the sensor the distance at several locations on the measuring object are simultaneously measured. It is to be understood that the measurement need not be effected simultaneously but may also be effected serially.

The line sensor may be conventionally formed by a PSD or a CCD or also from a matrix sensor, wherein however from the matrix in each case only one line becomes effective. Whilst CCD as is known stands for a digital sensor line, PSD is a line sensor which delivers an analog signal proportional to the illuminated location.

Preferably the lines which form the parallax-free cross on the measuring object are at right angles. This is not however a condition for a measurement.

The measuring apparatus for carrying out the method according to the invention may accommodate the line laser as well as the line sensor in a housing. It is however also conceivable to accommodate these parts in separate housings, wherein however the set distance between the line laser and the line sensor must be maintained.

BRIEF DESCRIPTION OF THE DRAWINGS

The invention is hereinafter described in more detail by way of two embodiment examples.

DETAILED DESCRIPTION OF THE INVENTION

Figure 1:
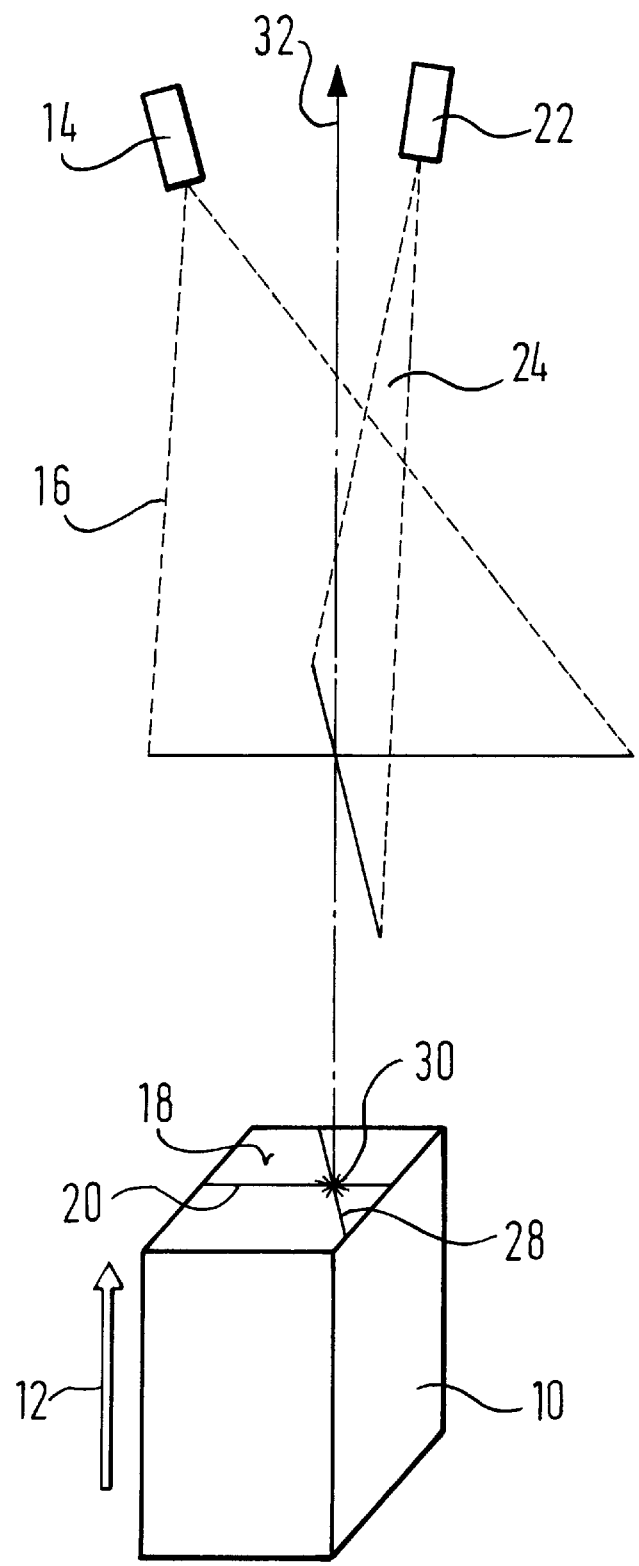
FIG. 1 shows a first embodiment example of a measuring device for carrying out the method according to the invention.

In FIG. 1 a trapezoidal measuring object 10 is indicated which can be moved forward in the direction of the arrow 12. It represents for example a slab on an rolling table.

A laser 14 produces a laser beam 16 so that on the surface 18 of the measuring object 10, which faces the laser 14, there is projected a light line 20. At 22 there is indicated a line sensor which comprises a row of light sensitive elements arranged on a line. Such line sensors are known per se. The line of the light sensitive elements spans a plane which is indicated at 24. It intersects the plane of the light beam 16 at an angle 16. The projection of the plane 24 onto the surface 18 is represented by the line 28. As a result there arises a crossing point 30 on tie surface 18.

The plane of the light beam 16 and the plane 24 are perpendicular to the surface 18. The crossing point 30 as a result does not change its position with a movement of the measuring object 10. The optics which are not shown, of the line sensor then observes the region of the light line 20 in the crossing point 30. This region is imaged at a different location on the sensor line according to the distance of the measuring object. Therefore a distance measurement as previously according to the laser triangulation may be carried out. It is however obtained as an advantage that the laser source 14 and the line sensor 22 do not lie on the measuring axis which is indicated at 32.

Figure 2:
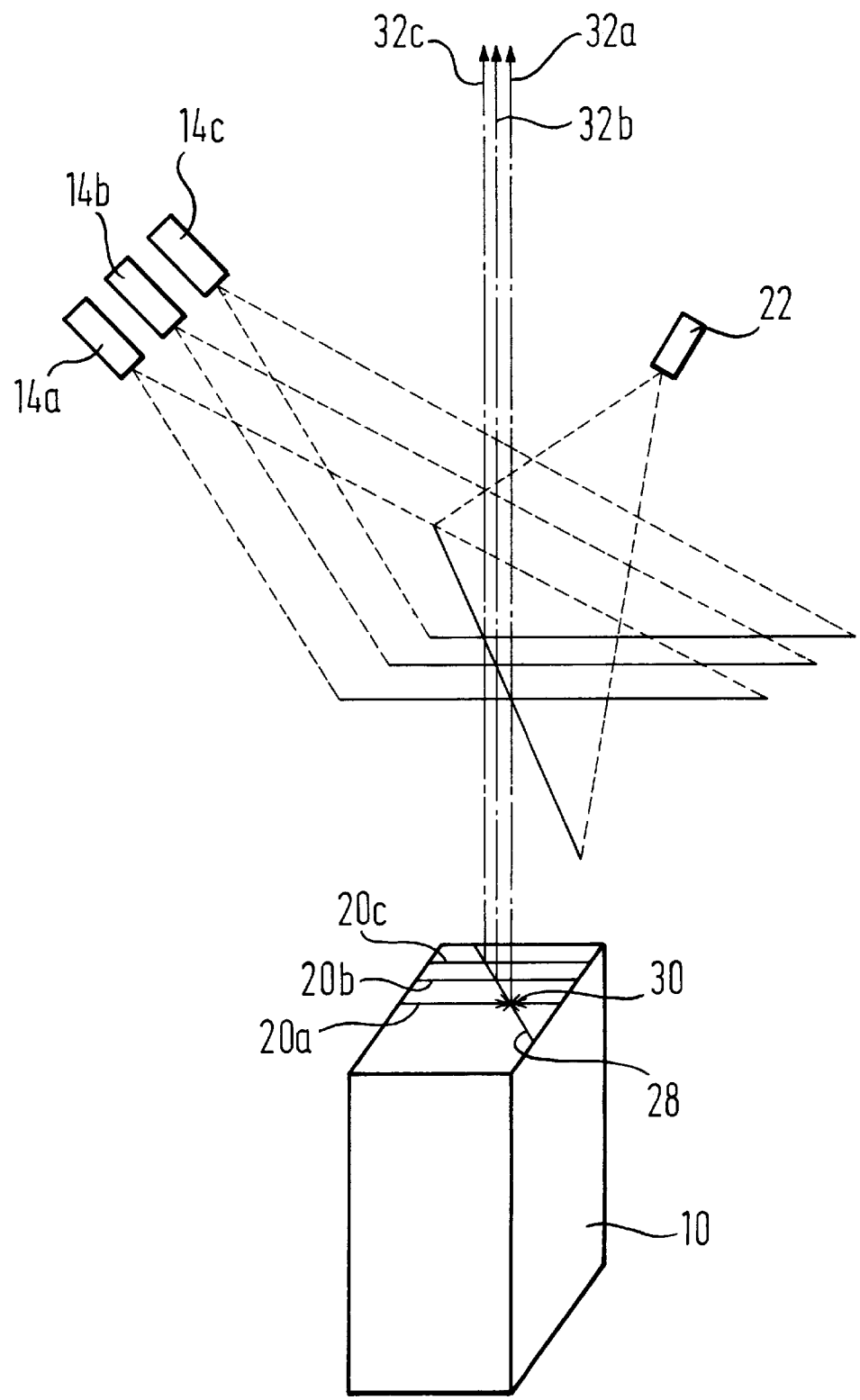
FIG. 2 shows a second embodiment example of a measuring device for carrying out the method according to the invention.

The embodiment form according to FIG. 2 differs from that according to FIG. 1 in that three line lasers 14a, 14b 14c are provided which project three parallel lines 20a, 20b, 20c onto the facing surface of the measuring object 10. The light planes of the lasers 14a to 14c are therefore arranged parallel to one another. The light sensitive receiver 22 corresponds to that according to FIG. 1.

The measuring principle of the device according to FIG. 2 corresponds to that according to FIG. 1, wherein however according to the crossing points of the line 28 with the light lines 20a, 20b, 20c it is made possible to test the distance of the measuring object at three locations.

What is claimed is:

1. A method for the contact-free measurement of the distance of an object according to the principle of laser triangulation, in which a laser beam is directed onto the measuring object having a measuring axis and the illuminated region is so imaged on a sensor with prior-arranged optics, which is arranged laterally next to the laser, that the position of the image on the sensor changes with the distance of the measuring object along the measuring axis and from the distance of the image from the laser a distance signal is obtained, wherein at least one laser projects a line onto the measuring object and the light plane of the laser line and the observation plane of the sensor form an angle and intersect in a parallax-free cross, such that the line laser and sensor are located outside the measuring axis.

2. A method according to claim 1, the sensor being a line-like sensor, wherein two or more lasers in each case produce a light plane in a manner such that onto the measuring object parallel lines are projected which form an angle with the observation plane of the line-like sensor.

3. A method according to claim 2, wherein the line sensor is a PSD or a CCD.

4. A method according to claim 2, wherein the light planes of the laser lines and the observation plane intersect at an angle of 90°.

5. A method according to claim 1, the sensor being a line-like sensor, wherein as a line sensor a PSD or CCD is applied.

6. A method according to claim 1, wherein as the sensor a matrix sensor is applied.

7. A method according to claim 1, the sensor being a line-like sensor, wherein the light plane of the laser line and the observation plane intersect at an angle of 90°.

8. A method according to claim 1, wherein the sensor is a matrix sensor.

9. A method according to claim 1, wherein the laser and the sensor are removed from the measuring axis such that they do not represent a hindrance when the measuring object is moved beyond the measuring apparatus along the measuring axis.

10. A method according to claim 9, the sensor being a line-like sensor, wherein two or more lasers in each case produce a light plane in a manner such that onto the measuring object parallel lines are projected which form an angle with the observation plane of the line-like sensor.

11. A method according to claim 10, wherein the light planes of the laser lines and the observation plane intersect at an angle of 90°.

12. A method according to claim 9, the sensor being a line-like sensor, wherein the light planes of the laser lines and the observation plane intersect at an angle of 90°.

* * * * *